United States Patent [19]

O'Quin, II et al.

[11] Patent Number: 4,463,418

[45] Date of Patent: Jul. 31, 1984

[54] ERROR CORRECTION FROM REMOTE DATA PROCESSOR BY COMMUNICATION AND RECONSTRUCTION OF PROCESSOR STATUS STORAGE DISK

[75] Inventors: John T. O'Quin, II; Robert A. Vossman; Rebecca S. Wood, all of Austin, Tex.

[73] Assignee: International Business Machines Corporation, Armonk, N.Y.

[21] Appl. No.: 280,023

[22] Filed: Jun. 30, 1981

[51] Int. Cl.³ ............................................. G06F 11/00
[52] U.S. Cl. ..................................... 364/200; 371/15; 371/29
[58] Field of Search ............................. 371/15, 16, 29; 364/200, 900

[56] References Cited

U.S. PATENT DOCUMENTS

| | | | |
|---|---|---|---|
| 3,325,788 | 6/1967 | Hackl | 364/200 |
| 3,343,141 | 9/1967 | Hackl | 364/200 |
| 3,564,509 | 4/1968 | Perkins et al. | 364/200 |
| 3,585,599 | 6/1971 | Hitt | 364/200 |
| 3,676,846 | 7/1972 | Busch | |
| 3,767,901 | 10/1973 | Black et al. | 364/200 |
| 3,784,801 | 1/1974 | Caputo et al. | 371/29 |
| 3,805,038 | 4/1974 | Buedel et al. | 371/29 |
| 3,825,901 | 7/1974 | Golnek et al. | 364/200 |
| 3,889,062 | 6/1976 | Epstein | |
| 3,909,802 | 9/1975 | Cassarino, Jr. et al. | |
| 3,910,322 | 10/1975 | Hardesty et al. | 371/15 |
| 3,916,177 | 10/1975 | Greenwald | |
| 3,940,744 | 2/1976 | Mock et al. | |
| 3,958,111 | 5/1976 | Hackett | |
| 4,225,918 | 9/1980 | Beadle et al. | 364/200 |
| 4,322,846 | 3/1982 | Carroll et al. | 364/200 |

OTHER PUBLICATIONS

"Remote Testing of Equipment," (pp. 1523-1524), IBM Technical Disclosure Bulletin, vol. 19, No. 5, Oct. 1976.

*Primary Examiner*—Charles E. Atkinson
*Assistant Examiner*—Michael R. Fleming
*Attorney, Agent, or Firm*—J. B. Kraft

[57] ABSTRACT

A system for diagnosing and correcting errors in remote data processing equipment is provided in which a remote data processor subject to an error condition has associated therewith disk, e.g., diskette storage means together with means for recording on said diskettes, data representing the status of the data processor under a particular error condition. The remote data processor further has associated therewith means for transmitting the status data stored on said diskette. First receiving means distant from the remote data processor receives the transmitted data and means associated with the receiving means reconstruct the diskette containing the error status data whereby this reconstruct diskette is now available for diagnostics at a point distant from said remote data processor.

9 Claims, 7 Drawing Figures

ERROR CORRECTION FROM REMOTE DATA PROCESSOR BY COMMUNICATION AND RECONSTRUCTION OF PROCESSOR STATUS STORAGE DISK

DESCRIPTION

1. Technical Field

This invention relates to communication of data between a transmitting and a remote receiving terminal, and more particularly, it relates to a system wherein communicated data is used for the purpose of diagnosing and correcting an error condition which exists in a data processor located at a remote location where engineering and service support necessary to correct the error condition may not be available.

2. Background Art

The data processing technology together with its offspring, the word processing technology have been rapidly expanding in recent years. Where ten years ago the number of data processors needing servicing in the United States was measured in thousands, at the present time, the processors potentially requiring service are measured in the hundreds of thousand and in the near future, there will be millions.

In addition, because of technological advancement, data processing and word processing fields are ones in which the cost of the processor is actually going down. Because of the combination of the relatively low selling prices of data processing and word processing units, together with the greatly expanding number of units potentially requiring service, the field has been seeking methods of reducing servicing requirements and particularly actual service calls wherein a service engineer or technician has to travel and visit the site where the data processing or word processing unit is located in order to repair it.

Many of the expedients available for avoiding a service call may be time consuming, i.e., requiring a considerable period of down time for the equipment which renders the approach undesirable.

The system of the present invention offers an approach which not only avoids costly service calls to correct error or problem conditions in data processing or word processing equipment but in addition is quite rapid. In fact, in many cases, particularly where the data processing equipment is at a location which is fairly remote from the nearest available servicing center, the system of this invention can correct many problems and error conditions in a much shorter time period than that required for the more costly service call.

DISCLOSURE OF THE INVENTION

The present invention involves a system which operates in the following manner. Let us assume that data processing or word processing equipment in a remote location, e.g., Naples, Italy, develops an error or problem condition. In accordance with the present invention, the remote processor has associated therewith, magnetic media storage means such as disks or diskettes. Further included are means for recording on such disks or diskettes, data representing the status of the data processor or portions thereof under this error condition. In other words, the processor has means for providing a data dump onto the diskette.

Associated with this remote data processor is transmission means for transmitting the status data stored on said magnetic media storage means, i.e., the data stored on said dump diskette.

Let us assume that while data processor service personnel are not available at the remote location in Naples, Italy, they are available in Austin, Tex. Thus, the invention further includes receiving means distant from said remote data processor, e.g., in Austin, Tex. for receiving said transmitted data and means associated with the receiving means for reconstructing the magnetic media storage containing said status data, e.g., the dump diskette communicated from Naples is reconstructed in Austin, Tex. and is now available for diagnostics in Austin. Thus, in a matter of minutes, we have available in Austin, the dumped diskette which a service engineer would have gotton out of the processor for his diagnostic purposes if he travelled to Naples.

In accordance with a further aspect of the present invention, the receiving location, i.e., the receiving means in Austin have associated therewith means for providing an error correction storage diskette or disk. After the error condition has been diagnosed by normal diagnostic methods associated with particular data processing or word processing equipment, there means produce a correction diskette. In addition, there are transmission means for transmitting the data on this correction disk or diskette. The remote location, i.e., Naples has associated therewith receiving means for receiving the data on the correction disk or diskette and means for reconstructing the error correction diskette or disk whereby the disk or diskette is available for the remote data processor. In other words, upon the reconstruction of the correction diskette in Naples, the data contained on this diskette may be loaded into the remote processor to correct the error condition which has been diagnosed and repaired in Austin.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1A:
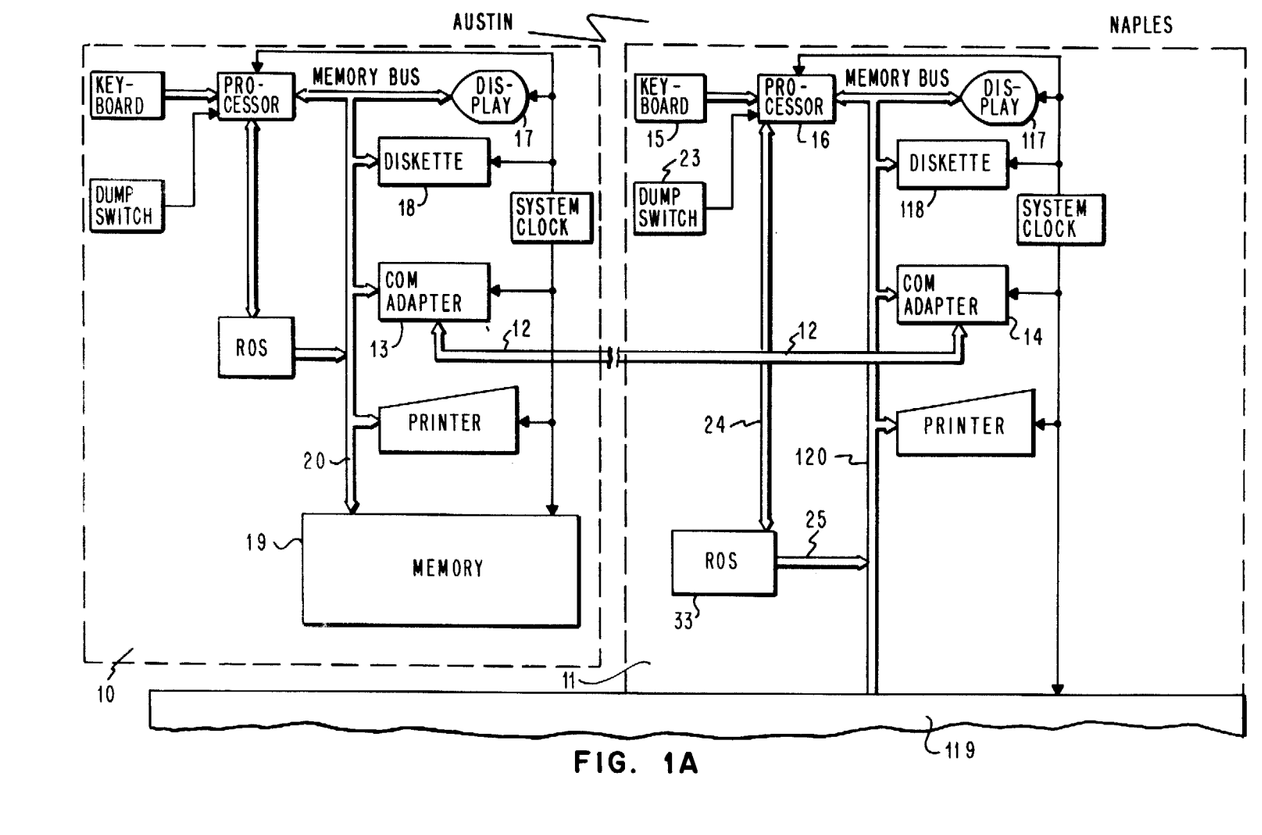
FIGS. 1A and 1B are a logical block diagram showing apparatus which may be used in the practice of the present invention.
Figure 1B:
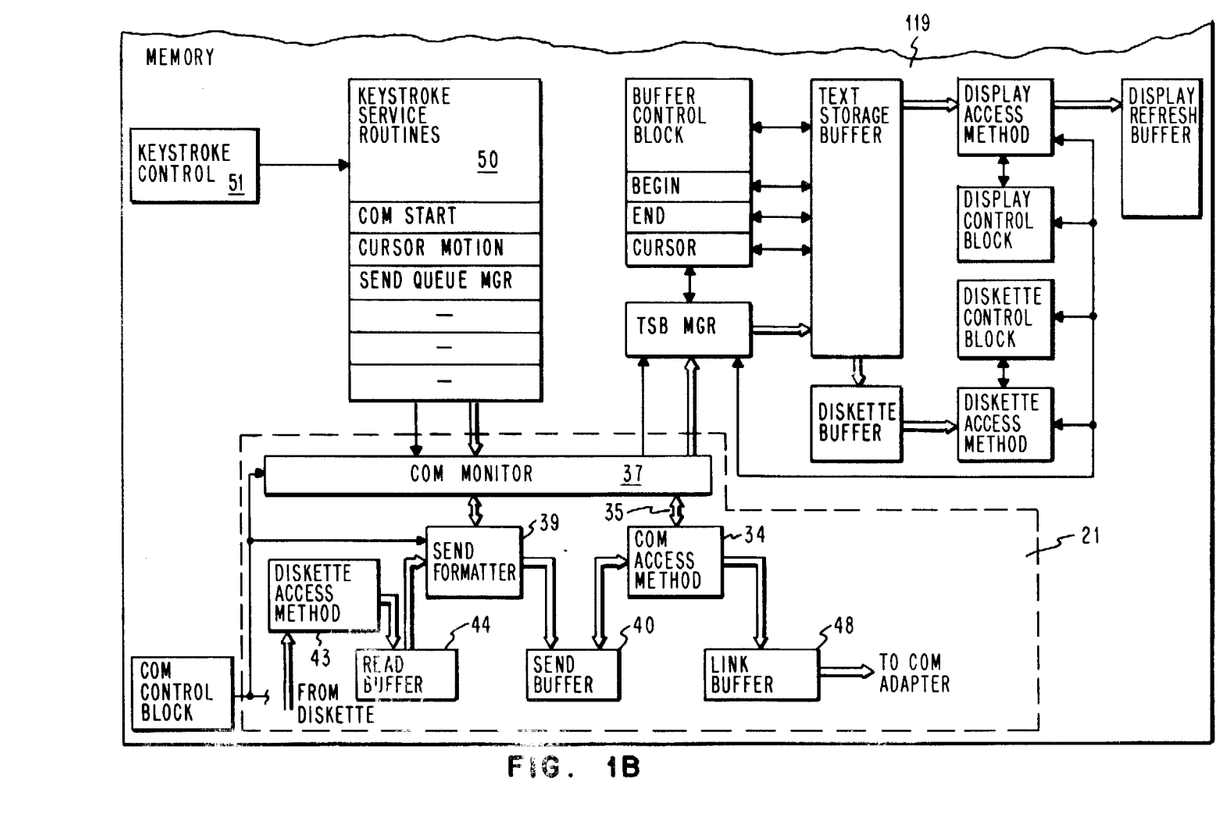

With reference to FIG. 1, the system of the present invention will be described. As a major aspect of the present invention involves communication between two data processors or word processors remote and distant from each other, the invention will be described and illustrated with respect to FIG. 1 which for purposes of the present illustration will consist of two identical word processing work stations or terminals. For example, the first work station 11 will be in Naples and the second work station 10 will be in Austin. In addition, for purposes of this illustration, we will assume that service support to correct and diagnose error and problem conditions is not available in Naples but is available in Austin and that an error or problem in the word processor occurs in Naples. Each of the two word processing work stations is a display terminal work station which has been modified in accordance with the present invention as will be hereinafter described in detail. Since the problem which we assume to occur has occurred in work station 11 in Naples, we will describe primarily the functional units in the Naples work station 11. However, it is to be understood that identical units exist in word processing work station 10 in Austin. After we describe the standard functions of these work stations, we will proceed to describe specific units necessary to carry out the various operations of the present invention and will also cover the functions of these units in a series of flow charts.

Now, with reference to FIG. 1, work stations 10 and 11 communicate with each other over a communication link 12 represented by a bus. Each of the terminals includes a communications adapter 13 and 14, each respectively connected to communication link 12. The communications adapters may be any standard device having capability, at the transmitting end, of converting parallel to serial data so that the data may be communicated over external lines and, at the receiving end, for reconverting the received serial data into parallel form so that it may be handled by the receiving display terminal. These communications adapters will not be described in detail since they are not involved in the present invention which is directed to how the data is transmitted and how transmitted data is handled once it is received at the receiving terminal.

The mode of communication over communication link 12 which represents a link between the two terminals is a synchronous serial communication. The communication adapter which can be used in the present invention is described in detail in co-pending application of D. M. Benignus, et al., assigned to the assignee of the present application, filed on or about June 16, 1981 Ser. No. 274,300. For purposes of describing the communications adapter, said co-pending application is hereby incorporated by reference. In addition, the general operations of the display terminals 10 and 11 is set forth in another co-pending application, D. G. Busch, entitled "Data Communications System With Receiving Terminal For Varying The Portions Of Received Data Being Displayed" assigned to the assignee of the present invention, also filed on June 16, 1981 Ser. No. 274,050 and hereby incorporated by reference. While this co-pending application uses an asynchronous protocol for communication while the present invention uses a synchronous protocol, the general operation of the display terminal logic will be substantially the same.

The following description made with respect to the second work station 11 is also substantially applicable to the first work station 10. In work station 11, the operator accesses the machine through operator control keys on a keyboard 15. The keyboard drives a processor 16. The processor 16 is operably interconnected into a visual display 17, a diskette 18, and a random access memory 19 via memory bus 20. A system clock 21 is provided for the timing functions within work station 11. The information transmitted from work station 11 in Naples to remote display terminal 10 in Austin is serially and synchronously sent over communication link 12 from communications adapter 14. Communications adapter 13 does a serial to parallel conversion of the input data and sends it over a memory bus 20 to memory means 19 which has the capability of storing the received data and displaying it at some subsequent time. Memory 19 includes a number of data areas and functional programs for operating with the data input into it through bus 20 from communications adapter 13.

Memory 119 of work station 11 and memory 19 of work station 10 which are substantially identical in structure contain all of the programming expedients and routines necessary to operate word processing work stations 10 and 11. The operations of many of these expedients, particularly with respect to the display function is described in greater detail in the above mentioned co-pending application of D. G. Busch entitled Data Communications System with Receiving Terminal for Varying the Portions of Received Data Being Displayed which may be referred to for greater detail.

In addition, the expedients required to carry out the functions of the present invention are also respectively included in memories 119 and 19 and these will now be described in greater detail. Each of the two memory units 119 and 19 contains the send formatting system 21 shown within the dashed lines of memory 119, FIG. 1 and the receive formatting system shown in FIG. 2. Although the send formatting and receive formatting systems are only shown with respect to memory 119 in work station 11, it is to be understood that memory 19 of word processing station 10 also contains identical send formatting and receive formatting systems.

The logic shown in FIG. 1 will now be considered in connection with the data handling processors which will be subsequently described in connection with the flow charts of FIGS. 3 through 6 in order to illustrate how the system of the present invention operates.

Let us assume that the operator is operating on word processing work station 11 in Naples when an error condition develops. The operator is incapable of diagnosing his problem. Let us further assume that the problem exists some place in memory 119 of work station 11. Then, with reference to FIG. 3, step 22, the operator presses the dump switch. This is merely a switch on the keyboard or elsewhere in word processing work station 11 which starts the dump procedure shown in FIG. 3 which results in the status of every bit in all of or a selected portion of memory 119 being stored onto or dumped onto a diskette. In other words, routine will provide on a diskette a "snap shot" dump giving the status of every bit in memory 119 of a selected portion of the memory at the time that the error condition arose. The operator presses dump switch 23, FIG. 1 which communicates with the processor 16 to activate a conventional routine stored in read only store (ROS) unit 33 resulting in the dump. Because data dumps onto storage means such as disks or diskettes are well known in the art, any conventional expedient for conducting such a data dump may be used. In any event, the dump routine stored in ROS 33 is activated from processor 16 over line 24 and communicated from ROS 33 to memory 119 via bus 25 and bus 120 which results in the status of the total context of memory 119 being dumped or loaded upon a diskette 118 via bus 120.

As each unit and section of memory 119 is dumped upon diskette 118, a decision step 27 (FIG. 3) is made as to whether the dump is complete. If the dump is complete, the routine is ended. If the dump is not complete, an address on the diskette is assigned for the particular portion of the status of memory 119 stored on diskette 118, step 28 and more data indicative of the status of memory 119 is written onto the diskette, step 29.

Figure 5:
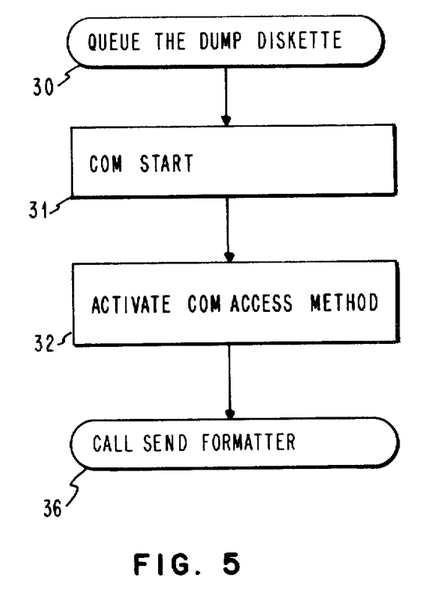
FIG. 5 is a flow chart of the general steps involved in the initiation and queueing of the dump diskette operation which is then carried out in accordance with the flow chart of FIG. 4.

At this point, the status diskette which we will refer to as the dump diskette reflecting the status of memory 119 during the error condition is to be queued for transmission to word processing work station 10 in Austin so that the service engineering support available in Austin may diagnose the error or problem condition. In order to accomplish this, the dump diskette must be queued for sending. With reference to FIG. 5, step 30, the dump diskette is queued. This is carried out under a standard queueing routine "Send Queue Manager" stored in key stroke service routine, block 50 of FIG. 1 which is under the control of key stroke control block 51.

Figure 4:
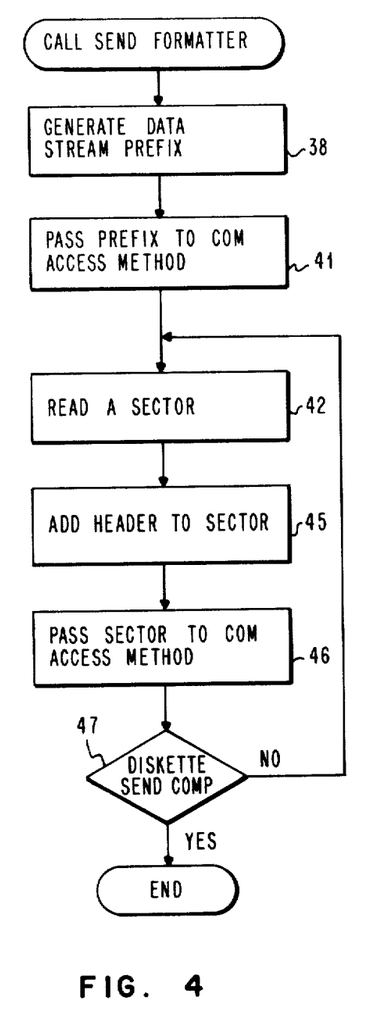
FIG. 4 is a flow chart of the operations of the apparatus during the sending of the data recorded on the dump diskette.

The next command in the sequence of FIG. 5 is the communication start command, step 32, which activates the communication monitor 37, FIG. 1, which in turn activates communication access method 34 via bus 35, as set forth in step 32 of FIG. 5. At this point, system is ready to communicate, i.e., transmit the dump disk to word processing work station 10 in Austin. Operator must establish communication linkage 12. Then, the "Send Formatter" routine is called, step 36. This "Send Formatter" routine is shown in FIG. 4. This "Send Formatter" routine is carried out by the send formatting system shown in FIG. 1. The operations of the "Send Formatter" routine will now be described using the operations flow chart of FIG. 4 with respect to the operational elements of FIG. 1. First, step 38, the prefix for the data stream to be transmitted or sent is generated. This is done in the "Send Formatter", block 39, and passed to the communications access method 34 via the send buffer 40 as shown in step 41. Next, step 42, a sector is read from the diskette 118 through diskette access method 43 into read buffer 44. Then, step 45, a header which contains control instructions is added to the sector in the read buffer, after which the sector is passed to the communications access method 34 in accordance with step 46. Then, the communications access method sends the data through the link buffer 48 to the communications adapter 14 through which data on the diskette is sent over communication linkage 12 to the communications adapter 13 at the receiving word processing work station 10.

Next, a determination is made, step 47, as to whether the entire dump diskette has been sent. If it has not, the operation is branched back to step 42 and the next sector is read. If the operation is complete, then the transmission ends. At this point, complete dump diskette has been sent to the word processing work station 10 at the remote location where the dump diskette is to be diagnosed.

Figure 2:
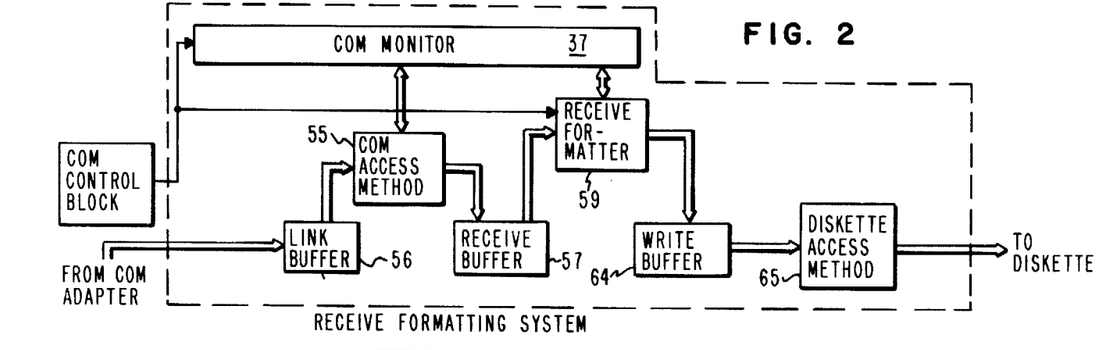
FIG. 2 is a logical block diagram of the logic used in the receive formatter system which may be used in combination with the logic shown in FIG. 1.
Figure 3:
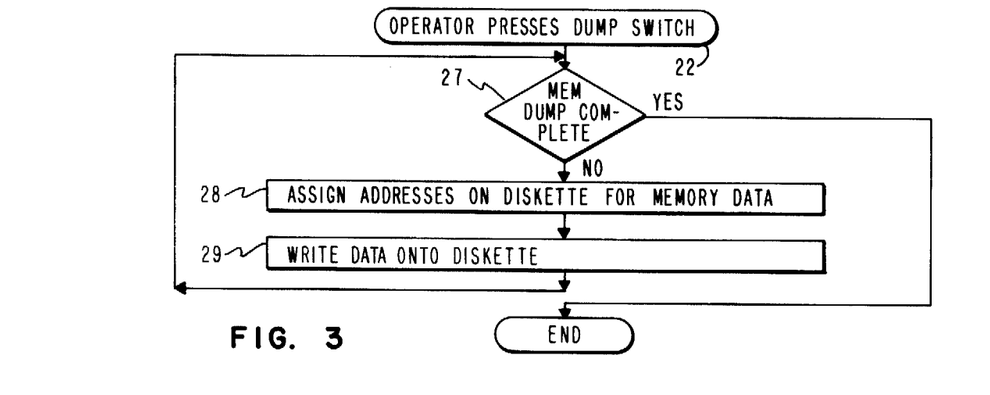
FIG. 3 is a flow chart showing the general steps involved in recording a machine status or data dump onto a diskette.

The reconstruction of the dump diskette, the data of which has been just transmitted will now be described with respect to word processing work station 10 in Austin. This is carried out using a receive formatting system the logic of which is shown in FIG. 2. It should be noted that the receive formatting system is attached to the communication monitor 37 and controlled by it in a fashion similar to the send formatting system. In the present embodiment, each of work stations 11 and 12 contain both the send formatting system 21 shown in FIG. 1 as well as the receive formatting system shown in FIG. 2. For purposes of the present illustrative communication, the receive formatting system in work station 10 is being considered in FIG. 2. When the data transmitted from work station 11 as previously described reaches the communication adapter 13 in work station 10, a data interrupt occurs, step 52, FIG. 6. This results in the receive formatter system of FIG. 2 being called, step 53. A decision is made in the receive formatter system, step 54, as to whether the complete diskette has been received as yet. If it has been received, the transmission is completed and we now have a complete reconstructed diskette. If the complete disk has been received, the routine ends. If the complete disk has not been received as yet, then the communication access method 55 fetches the section of data which has been received from the line buffer 56 and places it in the receive buffer 57 (step 58 in FIG. 6).

Figure 6:
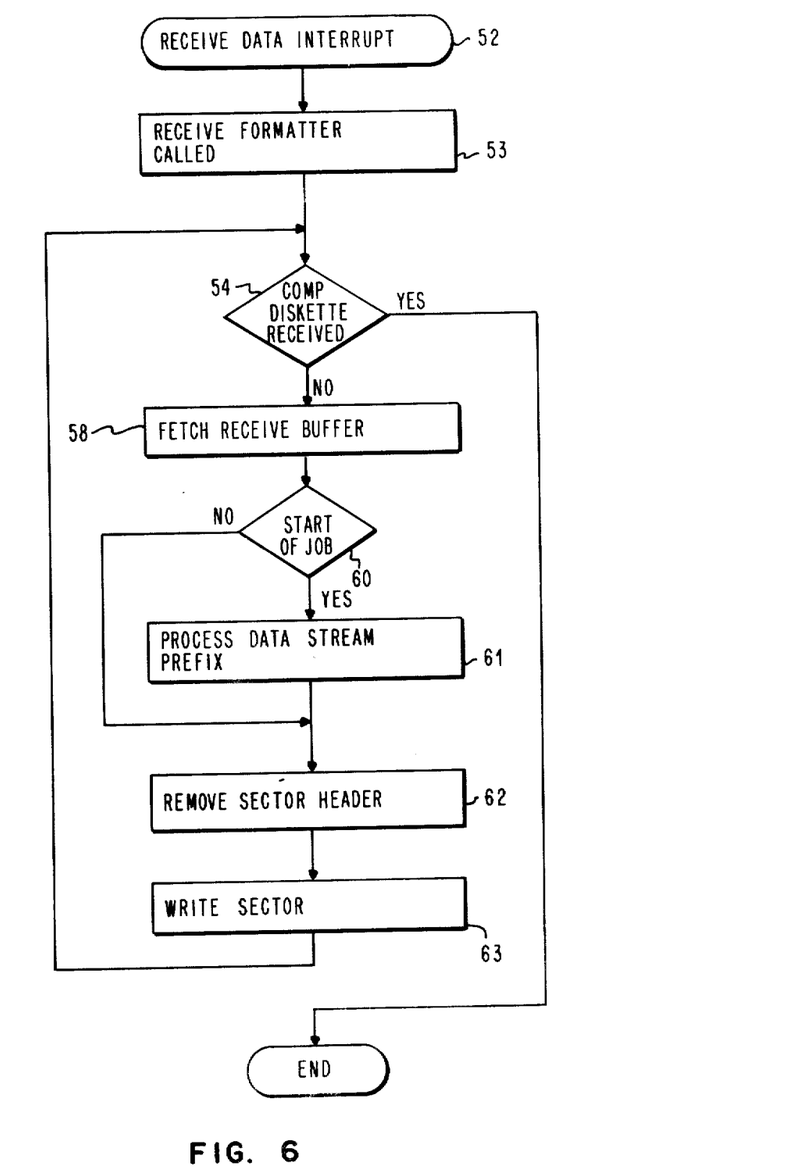
FIG. 6 is a flow chart of the operations involved in receiving data transmitted from another diskette at a remote location and reconstructing the data onto a diskette at the receiving location.

At this point a decision is made in receive format of block 59 as to whether this is the beginning of a job or function (step 60). If it is the beginning of a job or function, then the formatter 59 processes the previously described prefix (step 61). This involves an initiation step wherein the receiving disk medium is checked for compatibility with its equivalent medium at the transmitting end, e.g., since the disk or diskette is to be reconstructed at the receiving end, the disk medium at the receiving end is checked to see if it has equivalent structural properties such as size. In addition, a determination is made as to whether there are any optional information messages to be retrieved from the prefix and displayed on the display terminal of the receiving word processing station. Next, after the prefix has been processed or if it is not the start of a job, step 62 is carried out in formatter 59 and the sector header on the disk is removed. Next, step 63, next sector is written on the disk through the write buffer 64 communicating with the diskette access method 65 which in turn accesses disk 18 over bus 20.

This procedure is continued until the data representative of the dumped diskette from word processing work station 11 is received and recorded on a diskette 18 in remote word processing work station 10. We now have at work station 10 a complete reconstruction of the dumped diskette formed at work station 11. This diskette is now available for any conventional diagnostics which the service engineering personnel at the work station 10 location may wish to carry out either using word processor station 10 or any other diagnostic equipment.

Because diagnosis of data dumps for error and problem detection is an extensive and varied technology and is dependent on the nature of the application involved in the processor having the error condition, we will not here attempt to suggest any particular diagnostic technique which may be used on the data dump contained on the reconstructed diskette at work station 10. In any event, service engineering personnel at work station 10 using suitable conventional diagnostic techniques which would be essentially the same had they been available at work station 11 to deal directly with the original dump diskette now proceed to diagnosis and correct the problem.

Upon correction of the problem, they may now provide at work station 10 an initial correction diskette. This correction diskette may provide a status condition for all or any part of memory 119 in which the error occurred. This correction diskette when made available to memory 119 in work station 11 will correct the error condition in memory 119 and, thus, permit work station 11 in Naples to resume normal operations. The initial correction diskette made in connection with work station 10 in Austin may now be transmitted to work station 11 in Naples and based upon the data transmitted from work station 10, the word processor work station 11 can reconstruct the correction diskette and make it available for insertion of the correction status into memory 119.

Transmission of the data on the initial correction diskette formed at work station 10 to work station 11 may be carried out using the same procedures set forth hereinabove for the transmission of the data on the dump diskette from work station 10 to work station 11. The data thus transmitted may be rerecorded on a reconstructed correction diskette at work station 11 in Naples which is a full replica of the initial correction diskette formed at work station 10 in Austin. The reconstructed correction diskette when unloaded into memory 119 at work station 11 will correct the error status and permit work station 10 to resume its normal operation.

In the present application, the terms disk and diskettes have been used to describe magnetic storage media. However, only the term disk has been used in the claims wherein the term is used in its generic sense to cover both conventional disks and diskettes.

While the invention has been particularly shown and described with reference to a preferred embodiment it will be understood by those skilled in the art that various other changes in form and detail may be made without departing from the spirit and scope of the invention.

We claim:

1. A system responsive to the detection of error conditions in remote data processing equipment for diagnosing and correcting said errors comprising
   a remote data processor,
   a first magnetic media storage means associated with said remote data processor,
   means for detecting said error conditions,
   means operable upon the detection of said error conditions for recording on said storage means, data representing the status of the data processor under an error condition,
   first transmission means associated with said remote data processor for transmitting said status data stored on said magnetic media storage means,
   first receiving means distant from said remote data processor for receiving said transmitted data, and
   a second magnetic media storage means associated with said first receiving means,
   means associated with said receiving means for duplicating said status data on said second magnetic media storage means whereby said duplicated status data is available for diagnostics.

2. A system responsive to the detection of error conditions in remote data processing equipment for diagnosing and correcting said errors comprising
   a remote data processor,
   a first disk storage means associated with said remote data processor,
   means for detecting said error conditions,
   means operable upon the detection of said error conditions for recording on said disk storage means, a status disk representing the data processor status under an error condition,
   first transmission means associated with said remote data processor for transmitting the data stored on said status disk,
   first receiving means distant from said remote data processor for receiving said transmitted data,
   a second disk storage means associated with said first receiving means, and
   means associated with said receiving means for duplicating said status data on said second disk storage means whereby said duplicated status data is available for diagnostics.

3. The system of claim 2 further including
   means associated with said first receiving means for forming an error correction storage disk after said diagnostics are carried out,
   second transmission means for transmitting the data on said error correction disk,
   second receiving means associated with said remote data processor for receiving the data on said correction disk,
   and means associated with said remote data processor for forming a duplicate of the error correction disk whereby said duplicate disk is available for said remote data processor.

4. The system of claim 2 wherein said remote data processor is a first display word processor.

5. The system of claim 4 wherein said first receiving means are included in a second display word processor which further includes said second disk storage means and said duplicating means.

6. The system of claim 5 wherein said second display word processor further includes
   means for forming an error correction storage disk after said diagnostics are carried out, and
   second transmission means for transmitting the data on said correction disk and, said first display word processor further includes
   second receiving means for receiving the data on said correction disk, and
   means for forming duplicate of the error correction disk whereby said duplicate error correction disk is available for said first display word processor.

7. A process responsive to error conditions detected in remote data processing equipment for diagnosing and correcting said errors comprising
   recording on magnetic media storage means, data representing the status of a remote data processor under an error condition,
   transmitting said status data stored on said magnetic media storage means to first receiving means distant from said remote processor, and
   duplicating said status data on magnetic media storage means associated with said first receiving means whereby said duplicated status data is available for diagnostics.

8. A process responsive to error conditions detected in remote data processing equipment for diagnosing and correcting said errors comprising
   recording on disk storage means, a status representing a remote data processor status under an error condition,
   transmitting the data stored on said status disk to first receiving means distant from said remote data processor, and
   duplicating said status data on disk storage means associated with said first receiving means whereby said duplicated data is available for diagnostics.

9. The process of claim 8 further including the steps of
   diagnosing the error condition from said status disk,
   forming an error correction storage disk after said diagnostics are carried out,
   transmitting the data on said error correction disk to second receiving means associated with said remote data processor, and
   forming a duplicate of the error correction disk from said transmitted data whereby said duplicate error correction disk is available for said remote data processor.

* * * * *